United States Patent Office 3,664,710
Patented May 23, 1972

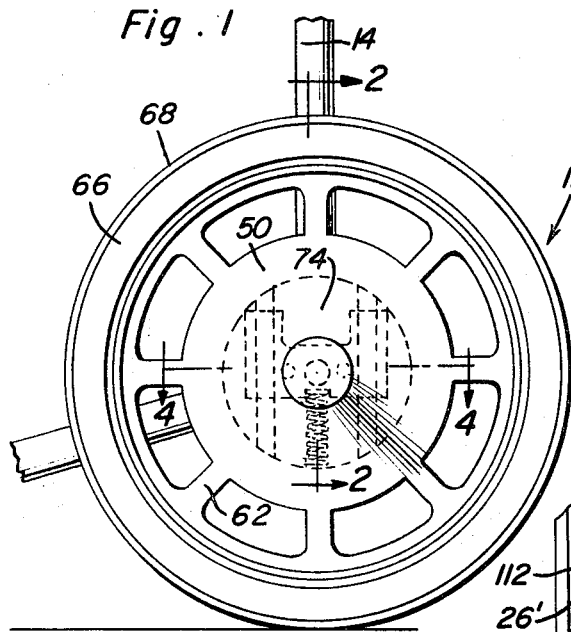
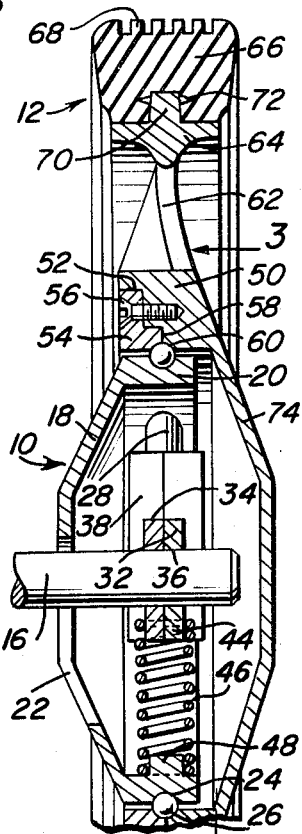
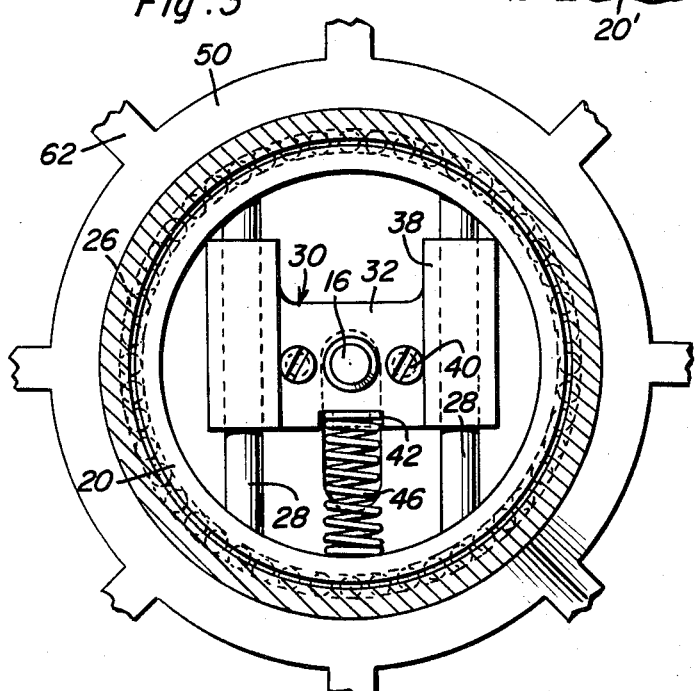
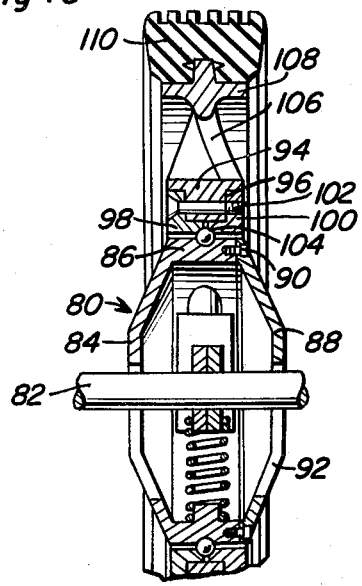
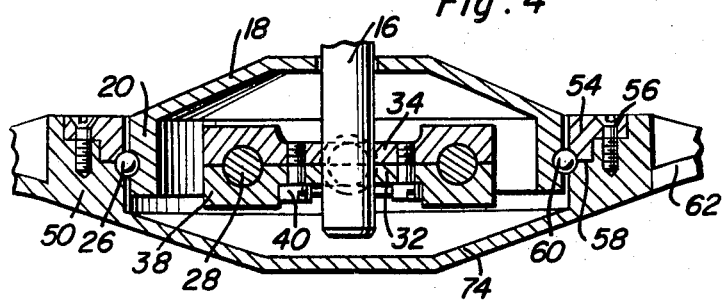
Raymond B. Leach
INVENTOR

3,664,710
RESILIENT HUB
Raymond B. Leach, Omaha, Nebr., assignor to
Miracle Hub and Wheel, Inc.
Filed Dec. 4, 1969, Ser. No. 882,190
Int. Cl. B60b 9/02
U.S. Cl. 301—136            9 Claims

ABSTRACT OF THE DISCLOSURE

A resilient hub connecting a rotatable annular member to an axle incorporating a resilient biased slide member to enable relative lateral movement between the annular member and axle with such movement being cushioned by and resisted by the resiliently biased slide member.

---

The present invention generally relates to a hub structure and more particularly a resilient hub forming a resiliently biased rotatable connection between an annular member such as a wheel and a rod or shaft such as an axle for the wheel.

In present day vehicular construction, some type of resilient support is provided between the load, occupant or passenger carrying component of the vehicle and the road engaging component thereof. Even in smaller vehicles such as golf bag carts, motorcycles, mini-bikes and the like, it is desirable to provide some type of resilient movement between the load carrying component and the component which engages a roadway or other supporting surface.

It is an object of the present invention to provide a resilient hub adapted for use in substantially any type of wheel to provide a resilient connection between the wheel axle and the annular wheel member or rim so that the annular member or wheel rim may shift laterally and preferably vertically in relation to the wheel axle.

Another object of the invention is to provide a resilient hub having a slide member attached to the vehicle axle and an annular bearing race having guide members engaged with the slide member to guide relative movement therebetween and a spring associated between the annular inner bearing member and the slide member with the external annular bearing member being connected with the annular wheel member whereby the wheel member may rotate in relation to the axle and the wheel member and axle may move laterally in relation to each other within the limits and under the influence or resistance of a spring interposed between the slide member and inner bearing member.

A further object of the invention is to provide a resilient hub adapted to various types of wheels for various types of vehicles which provides a mobile shock absorbing hub construction which is practical, workable, economical and adaptable to all wheels with the construction thereof enabling the components to be constructed economically by employing a plastic molding procedure, die casted aluminum molding procedure, or metal stamping procedures in manufacturing the hub. The hub is also constructed for use in conjunction wih any size wheel for any load requirement for the purposes desired and may incorporate various types of bearings therein such as a ball bearing assembly, roller bearing assembly, a sleeve type bearing or the like.

Still another object of the invention is to provide a resilient hub which is relatively simple in construction, dependable and long lasting, easy to maintain and relatively inexpensive to manufacture.

These together with other objects and advantages which will become subsequently apparent reside in the details of construction and operation as more fully hereinafter described and claimed, reference being had to the accompanying drawings forming a part hreof, wherein like numerals refer to like parts throughout, and in which:

FIG. 1 is a side elevational view of a wheel such as employed in a golf bag cart with the resilient hub of the present invention incorporated therein.

FIG. 2 is a vertical sectional view, on an enlarged scale, taken substantially upon a plane passing along section line 2—2 on FIG. 1 illustrating the structural details of the resilient hub.

FIG. 3 is a vertical, sectional view taken substantially upon a plane passing along section line 3—3 of FIG. 2 illustrating further structural details of the slide member guide and resilient spring.

FIG. 4 is a horizontal, sectional view taken substantially upon a plane passing along section line 4—4 of FIG. 1 illustrating further structural details of the resilient hub.

FIG. 5 is a detailed sectional view similar to FIG. 2 but illustrating a modified form of the invention.

FIG. 6 is a detailed sectional view of a modified form of bearing race assembly.

Referring now specifically to the drawings, the resilient hub of the present invention is generally designated by reference numeral 10 and is disclosed for use in combination with a wheel generally designated by the numeral 12 such as may be found on a golf bag cart which has not been specifically illustrated but frame components 14 have been illustrated along with a supporting axle 16 forming a component of a golf bag cart. It is pointed out that the wheel 12 and the resilient hub 10 may be employed in conjunction with various types of vehicles where it is desirable to employ a shock absorbing resilient hub structure between the wheel component and the load supporting component such as the frame members 14.

The resilient hub 10 includes an interior hub member 18 which is a generally cup-shaped member provided with an inner bearing member or race 20 at the outer periphery thereof which is substantially cylindrical in configuration and extends laterally from the hub member 18. Extending from the center of the hub member 18 is a vertically disposed slot 22 through which the axle 16 extends. As illustrated in FIG. 2, the slot 22 extends from a point adjacent the center of the hub member 18 to a point vertically spaced therefrom adjacent the lower portion of the bearing member 20. The exterior surface of the inner annular bearing member 20 is provided with a semi-cylindrical groove 24 receiving a portion of the periphery of a plurality of ball bearings 26.

Extending across the interior of the annular bearing member 20 is a pair of guide members 28 which are in spaced parallel relation to each other and are in the form of cylindrical rods or other shaped rod-like or bar-type elements which are fixedly secured to the interior surface of the inner annular bearing 20 in any suitable manner such as being made unitarily with the annular bearing member 20 and hub member 18. Slidably mounted on the guide rods or members 28 is a slide member generally designated by the numeral 30 and which includes a pair of plates 32 and 34 each of which has an aperture 36 therein receiving the axle 16. Each end of each plate 32 and 34 is provided with a semi-cylindrical extension 38 which when combined defines a cylindrical passageway receiving the guide members 28 therein as illustrated in FIG. 4. The plates 32 and 34 are secured in assembled relationship by fastener bolts 40 extending therethrough with a fastener bolt 40 being disposed to either side of the central opening 36 and extending through the plates 32 and 34 between the central opening 36 and the extensions or projections 38. The plates 32 and 34 have less height than the extensions 38 so that the relatively long extensions 38 will provide bearing engagement over a substantial length of the guide members 28 in order to stabilize the slide member 30 during its reciprocatory movement on the guide members 28.

The bottom edges of the plates 32 and 34 is provided with a notch 42 therethrough which defines a downwardly exposed spring guide 44 inserted into the upper end of a coil spring 46 which has its lower end positioned over an upwardly projecting spring guide 48 rigid with the bottom of the annular bearing member 20. The relationship of the spring 46, the upper spring guide 44 and the lower spring guide 48 is best illustrated in FIG. 2 with the notches 42 in the plates 32 and 34 being illustrated in FIG. 3.

With the construction as described, the hub member 18 and annular bearing member 20 may move laterally in relation to the axle 16 by virtue of the sliding movement of the slide member 30 on the guide members 28 with the spring 46 cushioning such movement and resiliently absorbing such movement and normally biasing the axle 16 and annular bearing member 20 in a position where the axle member 16 is oriented at the center of the bearing member 20 which is defined by the upper ends of the extensions 38 on the slide member 30 engaging the inner surface of the annular bearing member 20 as illustrated in FIG. 3.

The wheel 12 is mounted on the hub 10 for relative rotation and includes an annular outer member 50 which forms an outer bearing member in opposed relation to the bearing member 20. One side of the annular member 50 is provided with a recess 52 therein removably receiving an annular ring 54 which is removably retained in the recess by suitable screw-type fasteners or the like 56. The inner periphery of the recess 52 is offset as at 58 and the inner periphery of the ring 54 is correspondingly offset as illustrated in FIG. 2 with the portions of the ring 54 and annular member 50 at the juncture of the offset 58 having an annular semi-cylindrical groove 60 therein in opposed relation to the groove 24 in the bearing member 20 for receiving a portion of the external periphery of the ball bearings 26 as illustrated in FIGS. 2 and 3. Thus, with this construction, the outer annular member 50 and the annular ring 54 define an outer bearing member for the ball bearings 26 thus journaling the wheel 12 with respect to the hub 10.

Extending outwardly from the annular member 50 is a plurality of supporting spokes 62 which terminates in a peripheral wheel rim 64 which supports a solid tire 66 of rubber material or the like. The tire 66 has a suitable tread face 68 and is molded to the wheel rim 64 by the use of a peripheral projection 70 on the wheel rim 64 with the peripheral projection 70 having lateral projections 72 thereon so that the tire 66 may be molded onto the rim 64 and become fixedly and permanently attached thereto. The annular member 50 is also provided with a closure plate 74 which may be considered a hub cap since it closes off the outside of the hub structure with the plate 74 being rigid with and unitary with the annular member 50 thereby providing a hub structure for the wheel which is substantially concealed to protect the hub structure and also enhance the appearance of the wheel which utilizes the hub.

With this construction, the hub 10 enables rotational movement of the wheel 12 about an axis defined by the axle 16 with the axle 16 normally being disposed at the center of the wheel but the spring cushion construction of the hub 10 enables relative lateral movement of the wheel 12 in relation to the axle 16 to absorb shock and enable resilient relative movement between the load carried by the load carrying frame elements 14 and the support surface engaging member or tire 66.

FIG. 5 illustrates the modified form of hub 80 mounted on axle 82 with the hub 80 including a hub member 84 and an inner annular bearing member 86 with all of this structure corresponding with the structure illustrated in FIGS. 1–4. In this arrangement, the inner annular bearing member 86 is provided with an outer hub member 88 similar in configuration to the hub member 84 which is secured to the outer edge of the bearing member 86 by fasteners 90 or the like. In this arrangement, the axle 82 extends through both hub members 84 and 86 and each of these hub members is provided with a slot 92 to enable shifting movement of the hub 80 laterally of the axle 82 thereby enabling the hub 80 to be mounted on the center of an axle or the like facilitating its use in conjunction with various types of vehicles such as motorbikes, mini-bikes and the like. The outside of the bearing member 86 is provided with a groove for receiving the ball bearings in the same manner as in the structure illustrated in FIGS. 1–4. The external annular member or bearing member 94 includes a recess 96 on each side thereof for receiving a pair of ball bearing retainer rings 98 and 100 which are secured together and secured to the central part of the annular member 94 by suitable fastening bolts 102 or the like. The juncture edge of the L-shaped retaining rings 98 and 100 are provided with an annular groove 104 similar to the groove 60 in FIG. 2 for receiving the ball bearing members thus forming an outer bearing race or bearing member encircling the hub 80. In this form of the invention, the outer annular member 94 is provided with spokes 106 integral with a wheel rim 108 having the peripheral tire 110 mounted thereon which is the same as the structure illustrated in FIGS. 1–4.

When the hub is used with a wheel on a golf bag cart or the like, as the cart is towed over uneven terrain, rocks, holes or the like, the vertical forces that would normally be imparted to the axle 16 are cushioned by the resilient spring 46 by enabling relative vertical movement between the wheel and axle. While the materials employed may have self-contained lubricant qualities, if desired, lubricant fittings may be provided for the slide member and any suitable construction may be provided for anchoring the hub to the axle so that the guide members 28 are retained in a substantially vertical position. The hub assembly may be employed with various types of commercially available wheels constructed of various materials and with various strength requirements depending upon the use for which the wheel is intended. In addition, the hub may be employed in connection with other types of structures in which a rotatable annular member is mounted on a shaft or axle for relative rotation therebetween and where it is desired to provide relative lateral movement therebetween cushioned by a resilient spring to normally retain the axle and rotatable annular member in a predetermined relation with the axle and rotatable annular member having a coincident axis with the spring enabling relative lateral movement therebetween.

FIG. 6 illustrates a modified bearing race assembly in which hub member 18' includes an inner bearing race 20' receiving ball bearings 26'. An outer bearing race 50' is unitarily constructed and includes a radially extending screw threaded opening 112 which enables the ball bearings 26' to pass into and out of the facing grooves in the inner and outer bearing races. A flat headed screw 114 closes the opening 112 with the inner end of the screw 114 conforming in shape to the configuration of the bearing race. Any suitable index line arrangement or other indicating means may be provided for designating the proper rotational relationship of the screw 114 so that the inner tip end of the screw will be aligned with the groove in the bearing race.

The foregoing is considered as illustrative only of the principles of the invention. Further, since numerous modifications and changes will readily occur to those skilled in the art, it is not desired to limit the invention to the exact construction and operation shown and described, and accordingly all suitable modications and equivalents may be resorted to, falling within the scope of the invention.

What is claimed as new is as follows:

1. A hub assembly comprising a hub member adapted to be mounted on a support member, said hub member including an inner annular bearing member adapted to rotatably engage an outer annular member, said hub member including resiliently biased and transversely guided slide means operatively associated with the inner annular member and adapted to be mounted on a support member to enable relative transverse movement between the inner annular member and the support member, said slide means including a pair of spaced parallel sleeves, said hub member including parallel guide rods rigid with the inner annular bearing member, said sleeves being slidable on said guide rods thereby providing inependent encircling bearing engagement for the slide means at spaced areas, each of said sleeves being longitudinally split to enable assembly and disassembly thereof with respect to the guide rods.

2. A resilient hub for mounting on an axle and for supporting an annular member for rotation and relative transverse movement in relation to the axle comprising a hub member including an inner annular bearing member adapted to rotatably support an outer annular member in relation thereto, a slide member disposed interiorly of the inner annular bearing member, means interconnecting the slide member and the inner annular bearing member for guiding the slide member during transverse movement thereof in relation to the inner annular bearing member, said slide member including means for connection with an axle, and resilient means operatively associated with the slide member and inner annular bearing member to bias the slide member to a predetermined position in relation to the rotational axis of the outer annular member and cushioning and resiliently resisting relative transverse movement between the inner annular bearing member and axle, said guide means for the slide member including a pair of substantially parallel guide members extending across the inner annular bearing member, said slide member including plate means with tubular sleeve-like extensions on each side thereof in sliding engagement with the guide members, said plate means including a pair of plates having a portion of each extension formed on each side edge thereof, bolt means securing the plates together, said means for connection with an axle including a centrally disposed aperture in the plates to mount the slide member on the axle.

3. The structure as defined in claim 2 wherein said inner and outer annular members have facing grooves receiving a plurality of ball bearings therein, one of said annular members having an opening therein communicating with the groove therein to enable entry and exit of ball bearings, and a closure plug for said opening with the inner end of the plug conforming in shape with the groove to form a portion of the wall thereof when in position to close the opening.

4. The structure as defined in claim 2 wherein said outer annular member is in the form of a wheel engaging a supporting surface, said guide means for the slide member being disposed vertically to enable relative vertical movement of the wheel in relation to the axle.

5. The structure as defined in claim 4 wherein said resilient means includes a spring interposed between the slide member and the inner annular bearing member, said spring being capable of normally supporting the axle centrally of the inner annular bearing member.

6. The structure as defined in claim 5 wherein said hub member includes a cup-shaped plate rigid with the inner annular bearing member and including a slot receiving the axle to enable relative transverse movement between the inner annular bearing member and the axle.

7. The structure as defined in claim 6 wherein said outer annular member includes a cup-shaped plate overlying the inner annular bearing member, the guide means and slide member to conceal and protect these components.

8. The structure as defined in claim 6 wherein said inner annular bearing member includes a removable plate covering the hub on the side opposite from the cup-shaped plate.

9. The structure as defined in claim 6 wherein said inner annular bearing member includes a bearing race on the external surface thereof, said outer annular member having a bearing race formed on the inner surface thereof, and a removable annular ring forming a part of the bearing race and being detachably connected with the outer annular member to enable assembly and disassembly of the outer annular member in relation to the hub.

References Cited

UNITED STATES PATENTS

| 812,143 | 2/1906 | Leffort | 301—136 |
| 1,094,259 | 4/1914 | Scognamillo | 301—136 X |
| 1,111,473 | 9/1914 | Lahan | 301—136 |

FOREIGN PATENTS

| 373,789 | 3/1970 | France | 301—136 |

RICHARD J. JOHNSON, Primary Examiner

U.S. Cl. X.R.

308—182